United States Patent [19]

Kagitani

[11] Patent Number: 5,133,911
[45] Date of Patent: Jul. 28, 1992

[54] MULTILAYER PARISON EXTRUDER AND METHOD

[75] Inventor: Toshio Kagitani, Kanagawa, Japan

[73] Assignee: The Japan Steel Works, Ltd., Tokyo, Japan

[21] Appl. No.: 672,229

[22] Filed: Mar. 20, 1991

[30] Foreign Application Priority Data

Mar. 27, 1990 [JP] Japan .................................. 2-77240

[51] Int. Cl.⁵ .............................................. B29C 47/26
[52] U.S. Cl. ..................................... 264/40.7; 264/515;
264/541; 264/173; 425/133.1; 425/145;
425/149; 425/462
[58] Field of Search ..................... 264/40.7, 40.1, 515,
264/541, 40.3, 173; 425/145, 149, 380, 381, 462,
133.1, 131.1, 466, 467, 465, 532

[56] References Cited

U.S. PATENT DOCUMENTS

| | | | |
|---|---|---|---|
| 3,801,254 | 4/1974 | Godtner | 264/515 |
| 4,063,865 | 12/1977 | Becker | 425/380 |
| 4,422,838 | 12/1983 | Iwawaki et al. | 264/541 |
| 4,717,326 | 1/1988 | Motonaga et al. | 425/133.1 |
| 4,867,664 | 9/1989 | Fukuhara | 425/133.1 |
| 4,978,290 | 12/1990 | Fukuhara | 425/133.1 |

FOREIGN PATENT DOCUMENTS

| | | | |
|---|---|---|---|
| 3623308 | 1/1988 | Fed. Rep. of Germany | 425/133.1 |
| 62-99115 | 5/1987 | Japan | 425/133.1 |

*Primary Examiner*—Jeffery Thurlow
*Attorney, Agent, or Firm*—Sughrue, Mion, Zinn, Macpeak & Seas

[57] ABSTRACT

An extruder for extruding a multilayer parison and a method for doing the same. The extruder includes a cylinder having a cylindrical hole and a die slit which extrudes a parison, a ring piston movably fitted in the cylindrical hole, a multilayer head provided between the die slit and the ring piston, and a plurality of annular nozzles concentrically provided in the multilayer head, the annular nozzles facing and being opened to the side of the die slit. The extruder further includes a plurality of flow passages through which material flows, the flow passages communicating with annular nozzles and being circumferentially spaced from one another at equal intervals, control valves for controlling the flow rate of the material passing through the flow passages, each of control valves being connected to the corresponding flow passages, driving member respectively connected to the control valves for driving the control valves, pressure gauges for detecting the pressure of material passing through the flow passages, and control member for inputting each detecting signal from the corresponding pressure gauge and outputting each driving signal to the corresponding driving member in order to apply a constant flow pressure or to apply a predetermined proportional flow pressure.

3 Claims, 2 Drawing Sheets

MULTILAYER PARISON EXTRUDER AND METHOD

BACKGROUND OF THE INVENTION

The present invention relates to a multilayer parison extruder and method for extruding the multilayer parison.

A hollow resin receptacle is manufactured utilizing a blow molding method. Specifically, the hollow receptacle can be manufactured by blowing pressurized fluid through a die.

In a conventional multilayer parison extruder disclosed in the Japanese unexamined published patent application No. 62-99115, a ring member is concentrically provided with respect to an annular passage of a primary material resin and an auxiliary material resin is extruded from not less than one annular nozzle provided in the ring member. Each annular nozzle has an inlet port from which the material flows. In this structure, a material having good forming characteristics and being permeable to gasoline, such as a high density polyethylene, is used as a primary resin material and is utilized for most outer and inner layers. In contrast, a material which is impermeable to gasoline, such as a nylon resin, is used for an auxiliary material and is utilized for middle layers. The gaps between each layer are adhered by adhesive material layers. The thus produced multilayer parison can be used to produce a gasoline tank or the like.

However, the problem associated with a multilayer parison manufactured using the conventional multilayer parison extruder is that the thickness of each layer in the circumferential direction is not uniform. More specifically, a material flowing from the inlet port must be circumferentially spread and extruded uniformly. However, in the conventional structure, in the nozzle portion located proximate the inlet port, the extrusion pressure is relatively high, and conversely in the nozzle portion located away from the inlet port, the extrusion pressure is relatively low. Therefore, the flow rate of the material which is extruded from the nozzle located near the inlet port is larger than the flow rate of the material which is extruded from the nozzle located away from the inlet port. For this reason, the thickness of parison becomes relatively thick near the inlet port, and conversely, the thickness of parison becomes relatively thin at the portion away from the inlet port, thereby resulting in an uneven thickness in the circumferential direction. The uneven thickness results in the production of defective products.

SUMMARY OF THE INVENTION

The present invention was made in order to solve the above-mentioned problems.

With respect to the present invention, forming materials are supplied to annular nozzles from a plurality of flowing passages which are circumferentially spaced from one another at equal intervals. In addition, controlling valves for controlling the flow quantity, pressure gauges for detecting the pressure of the material flowing through the passages and driving devices for driving the controlling valves are provided along the passages. Further, a control device for controlling the driving devices is provided in order to apply a constant flow pressure to ensure a uniform parison thickness or to apply the predetermined proportional flow pressure to ensure a predetermined varied parison thickness, thereby solving the above-mentioned problems.

The present invention is related to a method for extruding a multilayer parison in which a plurality of materials are respectively extruded from annular nozzles which are concentrically located, and are laminated to one another. More specifically, the present invention comprises the steps of supplying one kind of a forming material from a plurality of flow passages which are circumferentially spaced from one another at equal intervals and are respectively communicated with predetermined annular nozzles, measuring a pressure value of each flow passage, and controlling the quantity of forming material supplied from each flow passage so that each pressure value of the flow passages is maintained equal to provide a uniform thickness or is maintained at a predetermined proportion, with respect to the other pressure values, to provide a predetermined variation in thickness. The number of annular nozzles of which the pressure value is measured may be one of the nozzles or all of the nozzles.

In addition, the present invention relates to a multilayer parison extruder, comprising a cylinder having a cylindrical hole and a die slit which extrudes a parison, a ring piston movably fitted in the cylindrical hole, a multilayer head provided between the die slit and the ring piston, and a plurality of annular nozzles concentrically provided in the multilayer head, the annular nozzles facing and being opened to the side of the die slit. The extruder further includes a plurality of flow passages through which the materials flow, the flow passages communicating with annular nozzles and being circumferentially spaced from one another at equal intervals, control valves for controlling the flow rate of the material passed through the flow passages, each of the control valves being connected to the corresponding flow passage, driving member respectively connected to the control valves for driving the control valves, pressure gauges for detecting the pressure of material passed through the flow passages, and a control member for inputting each detecting signal from the corresponding pressure gauge and out-putting each driving signal to the corresponding driving member in order to apply a constant flow pressure or to apply a predetermined proportional flow pressure.

In the present invention, the forming material is supplied to the annular nozzle from a plurality of flow passages which are circumferentially spaced from one another at equal intervals. Each pressure value of the supply material is measured by the pressure gauge connected to the corresponding flow passage. The data measured by each pressure gauge is inputted into the control device. After comparing each inputted data, each driving device connected to the corresponding control valve is controlled in order to apply the constant pressure value or to apply the predetermined proportional pressure value by the control device.

DETAILED DESCRIPTION OF THE PREFERRED EMBODIMENT

An embodiment of the present invention is hereafter described in detail with reference to the accompanying drawings.

Figure 1:
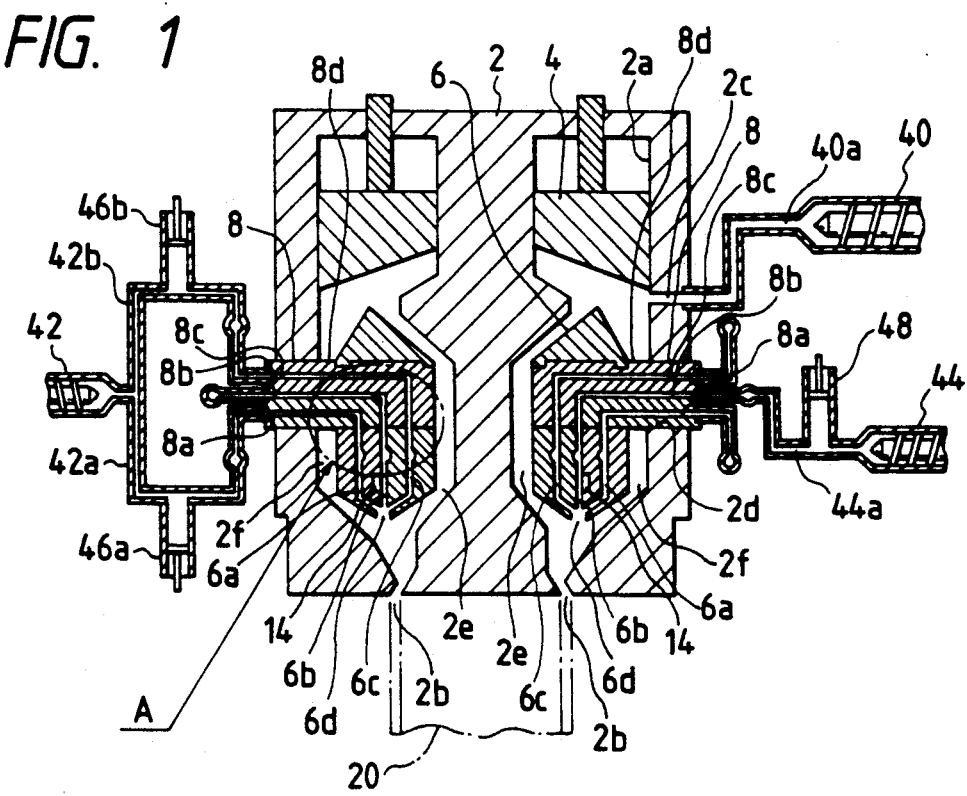
FIG. 1 is a longitudinal sectional view of a multilayer parison extruder according to an embodiment of the present invention.
Figure 2:
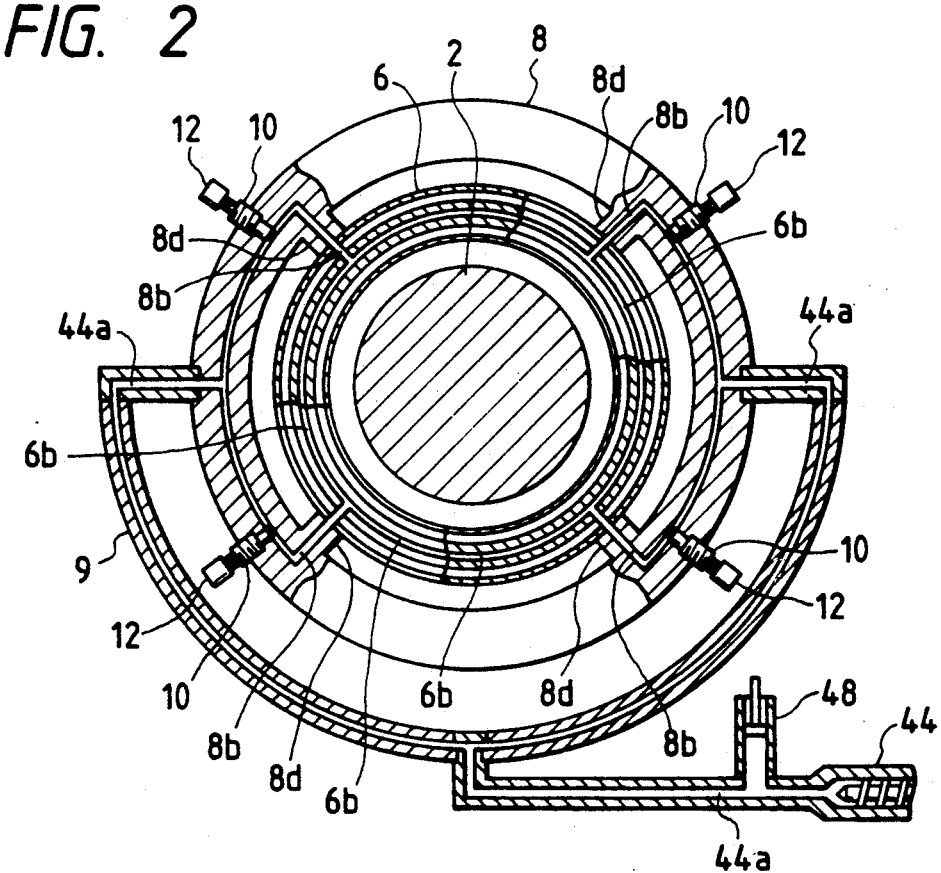
FIG. 2 is a cross-sectional view of the extruder, and shows a passage of an auxiliary material.
Figure 3:
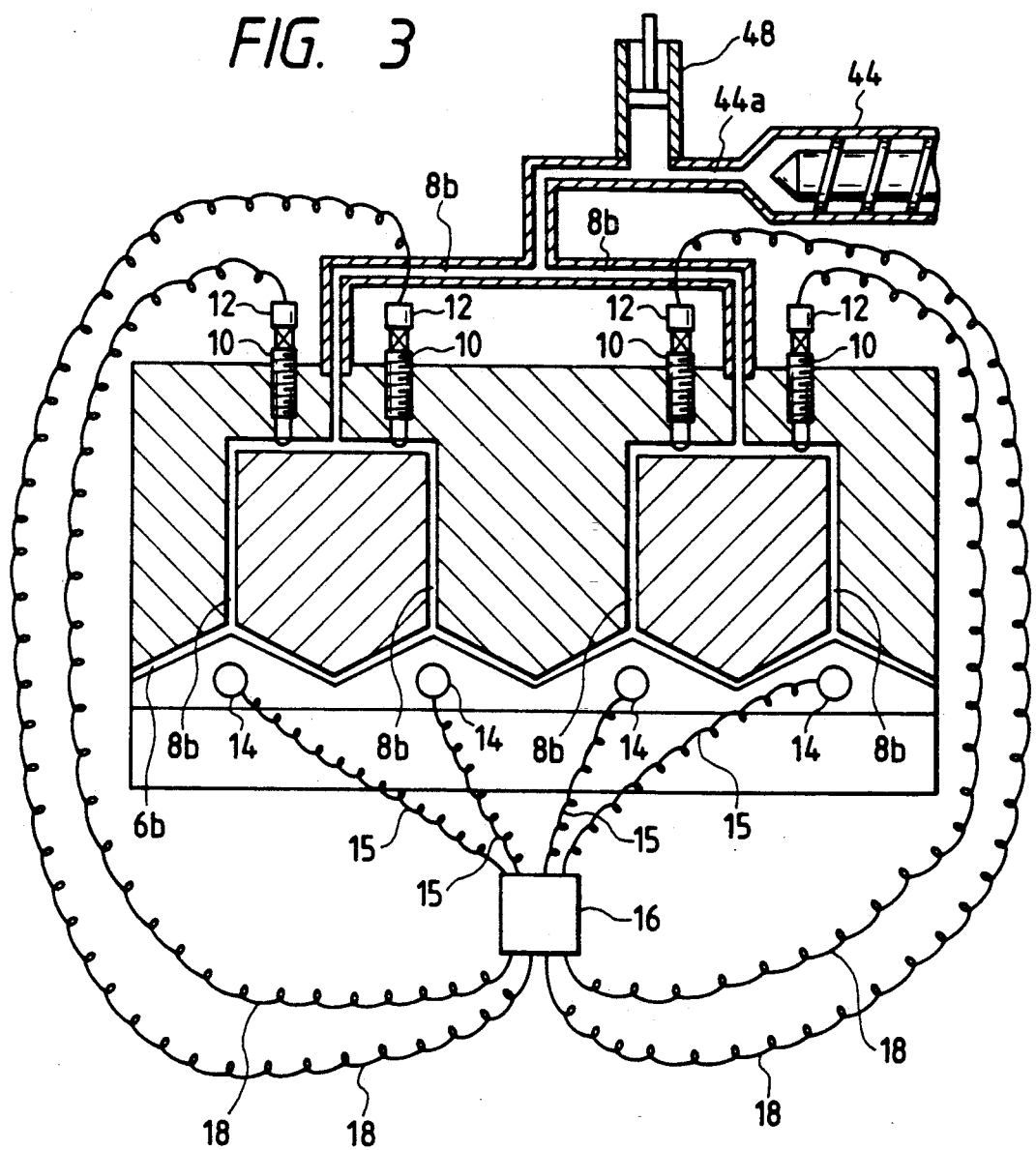
FIG. 3 is a schematic developed view of a portion A shown in FIG. 1.

FIGS. 1-3 show a primary part of a multilayer parison extruder according to an embodiment of the present invention. Referring to FIG. 1, a cylinder hole 2a is formed in a cylinder 2 in the axial direction, and a ring piston 4 is slidably disposed therein. A die slit 2b is provided in the exit side of the cylinder 2, and a parison 20 can be extruded therefrom. A ring-shaped multilayer head 6 is located between the ring piston 4 and the die slit 2b in the cylinder 2, separate from both the inner and outer wall surfaces of cylinder hole 2a. The multilayer head 6 is supported by a head ring 8, described below. Three annular nozzles 6a, 6b and 6c are concentrically provided in the surface of the multilayer head 6 facing the die slit 2b. The annular nozzles 6a, 6b and 6c are combined into one annular exit port 6d at the end portion and on the exit side of the multilayer head 6. Accordingly, it is possible to laminate a plurality of materials in the multilayer head 6 and to extrude them from the annular exit port 6d toward the side of die slit 2b.

A port 2c is radially provided on the circumference of the cylinder 2 communicating a feed pipe 40a of a main material injector 40 with the cylinder hole 2a. A hole 2d extending through the cylinder hole 2a is provided on the circumference of the cylinder 2 at a position offset from the port 2c toward the side of die slit 2b. A head ring 8 having flow passages 8a, 8b and 8c disposed therein is fixedly provided in the hole 2d.

The annular nozzle 6b communicates with a feed pipe 44a of an auxiliary injector 44 through the flow passages 8b. An accumulator 48 is connected to the feed pipe 44a. Similarly, the annular nozzles 6a and 6r respectively communicate with the feed pipes 42a and 42b through the passages 8a and 8c. Accumulators 46a and 46b are respectively connected to the feed pipes 42a and 42b.

As shown in FIG. 2, the multilayer head 6 is supported by four support members 8d which are circumferentially spaced from one another at equal intervals along the circumference of the head ring 8. The flow passages 8b communicate with the annular nozzle 6b by passing through each support member 8d. Additionally, arc-shaped passages 9 are provided in the head ring 8 and interconnect the flow passages as best illustrated in FIG. 2.

More particularly, the four flow passages 8b are circumferentially spaced from one another at equal intervals along the circumference of the head ring 8. The feed pipe 44a is connected to arc-shaped passages 9, and communicate with the inlet port of the correspondinq flow passages 8b through the arc-shaped passages 9. Four control valve 10 for controlling the flow rate are circumferentially spaced from one another at equal intervals along the arc-shaped passages 9 in the proximity of the outlet of each passage 8b. A driving device 12 is mounted to each control valve 10.

As shown in FIG. 3, which is a schematic developed view of portion A shown in FIG. 1, four pressure gauges 14 are circumferentially spaced from one another at equal intervals proximate the area where passages 8b are connected to annular nozzles 6b for detecting the pressure of the material passing through the flow passages. A control device 16 is provided so as to input the necessary signals from each pressure gauge 14 through the corresponding signal line 15. The control device 16 can send an independent control signal to each driving device 12 by corresponding signal line 18.

The operation of the multilayer parison extruder will now be described in detail. It is assumed that the multilayer parison having the auxiliary material of uniform thickness over the circumference is to be produced by the extruding device.

In the step of accumulating the resin material, a primary material fed from the main material injector 40 is caused to flow from port 2c into cylinder hole 2a through the feed pipe 40a so that the annular piston 4 is pushed by the primary material, thereby accumulating the primary material in the cylinder hole 2a. Similarly, an adhesive material fed from an adhesive material injector 42 is accumulated into accumulators 46a and 46b through feed pipes 42a and 42b, while an auxiliary material fed from an auxiliary material injector 44 is accumulated in accumulator 48 through the feed pipe 44a. When the accumulating step of each material has been finished, the ring piston 4 and accumulators 46a, 46b and 48 are respectively operated, causing each material to be extruded. The adhesive material extruded from accumulator 46a, 46b flows into annular nozzles 6a and 6c in the multilayer head 6 through feed pipes 42a and 42b and passages 8a and 8c of the head ring 8. In addition, the auxiliary material extruded from accumulator 48 flows into the annular nozzle 6b on the multilayer head 6 through the passage 8b of the head ring 8. The primary material is directed toward the die slit 2b through the inside annular passage 2e and the outside annular passage 2f of the multilayer head 6. Accordingly, the primary material is divided into inner and outer layers by the multilayer head 6.

The adhesive material layers flow through the annular nozzles 6a and 6c, and the auxiliary material layer which is surrounded by the adhesive material and flowing through the annular nozzle 6b, are extruded from the annular exit 6d so as to be laminated to each other. Further, the primary material layer is extruded from the die slit 2b in such a manner that the primary material layer surrounds the three layers of two kinds of material, that is, two adhesive material layers and one auxiliary material layer between the inner and the outer layers of the main material, thereby forming a cylindrical multilayer parison 20. More particularly, as shown in FIG. 4, which is a sectional view of a portion of a multilayer parison 20, the first main material layer 20a, the first adhesive material layer 20b, the auxiliary material layer 20c, the second adhesive material layer 20b' and the second main material layer 20a' are laminated to one another from the most outer layer in the stated order.

Figure 4:
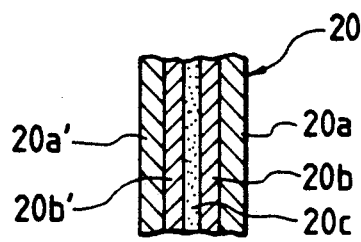
FIG. 4 is a sectional view of a portion of multilayer parison extruded by the extruder.

Referring to FIGS. 3 and 4, the pressure values are inputted into the control device 16 from the pressure gauges 14 provided on the circumference of the auxiliary material layer 20c via signal lines 15. When the pressure values of each of the pressure gauges 14 are not equal, the control device 16 sends driving signals to each driving device 12 through the corresponding signal line 18 in order to apply the constant pressure value. Thereafter, each driving device 12 controls the corresponding control valve 10 in order to restrict the flow rate in accordance with the driving signal. Therefore, the thickness of the auxiliary material in the circumferential direction is uniform.

In this embodiment, the circumference of the annular nozzle 6b is divided in four arcuate portions by four flow passages 8b, equally spaced from one another by 90 degrees. The auxiliary material passed through the four flow passages 8b of the head ring 8 is supplied to one of the four divided arcuate portions of the annular nozzle 6b. Accordingly, it can be easily understood that the pressure of the resin can be more closely maintained at a constant value since the resin material is extruded from the arc-shaped portion corresponding to angular intervals of about 90 degrees as compared to the conventional arrangement in which the auxiliary material is supplied to the entire circumference of the annular nozzle 6b through a single flow passage. Further, it is easier to plan the above-mentioned flow passages as compared to the conventional arrangement.

When it is desired to produce a multi-layered parison varying in thickness along the circumference, each driving device 12 and the corresponding control valve 10 can be controlled by the control device 16 in order to apply predetermined proportional pressure values necessary to produce the variation in thickness.

The present invention is not confined to the above-described embodiment, but may be embodied or practiced in other various ways without departing from the spirit or essential character thereof. For example, a member for controlling the thickness of the article may be provided for the passage of primary material or the passage of adhesive material as required. In addition, although four flow rate control valves, four driving devices and four pressure gauges are used in the above-described embodiment, the number of these members may be increased to control the thickness in smaller ranges. Further, the multilayer head 6 and the head ring 8 may be provided in one unit.

Although the multilayer parison is made of the five layers of three kinds of materials by the above-described embodiment, the present invention may be otherwise embodied. For example, a multilayer parison may be made of three layers of three kinds of materials by action similar to those in the preceding embodiment.

As described above, since the thickness of a predetermined layer is controlled before a plurality of layers are laminated, the multilayer parison having a predetermined thickness can be produced by extruding molding.

What is claimed is:

1. A method for extruding a multilayer parison in which a plurality of materials are respectively extruded from concentrically located annular nozzles, and are laminated to one another, comprising the following steps:
    supplying each of said materials to each of said nozzles, each of said materials passing through a plurality of flow passages which are circumferentially spaced from one another at equal intervals and communicate with each of said annular nozzles;
    measuring a pressure value of each flow passage; and
    controlling the flow rate of said material supplied from each flow passage so that each pressure value of each flow passage is maintained to apply a constant flow pressure to ensure a uniform parison thickness or to apply a predetermined proportional flow pressure to ensure a predetermined varied parison thickness.

2. A multilayer parison extruder for extruding a plurality of materials comprising:
    a cylinder having a cylindrical hole and a die slit which extrudes a parison;
    a ring piston movably fitted in said cylindrical hole;
    a multilayer head provided between said die slit and said ring piston;
    a plurality of annular nozzles concentrically provided in said multilayer head, said annular nozzles facing and being opened to the side of said die slit;
    a head ring having a plurality of flow passages communicating with each of said annular nozzles and being circumferentially spaced from one another at equal intervals around said head ring;
    control valves connected to each of said flow passages for controlling the flow rate of said materials passing through said flow passages;
    driving means respectively connected to said control valves for driving said control valves so as to adjust said flow rate; and
    pressure gauges for detecting the pressure of said materials through said flow passages; and
    control means for controlling said driving means based on the detection of the pressure of said materials detected by said pressure gauges in order to apply a constant flow pressure to ensure a uniform parison thickness or to apply a predetermined proportional flow pressure to ensure a predetermined varied parison thickness.

3. The multilayer parison extruder of claim 2 wherein said pressure gauges are respectively disposed proximate the area where said flow passages communicate with said nozzles.

* * * * *